(12) United States Patent
Bhatia et al.

(10) Patent No.: US 6,992,618 B2
(45) Date of Patent: Jan. 31, 2006

(54) METHOD AND APPARATUS FOR SCHEDULING SEARCH FOR AND ACQUISITION OF GLOBAL POSITIONING SATELLITES

(75) Inventors: Ashok Bhatia, San Diego, CA (US);
Paul R. Johnson, San Diego, CA (US);
Abhay Joshi, San Diego, CA (US);
Arthur Neufeld, Longmont, CO (US);
Arie Rahmat, San Diego, CA (US);
Borislav Ristic, San Diego, CA (US);
Mark C. Roh, San Diego, CA (US);
Glenn Salaman, Lafyette, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/734,382

(22) Filed: Dec. 11, 2003

(65) Prior Publication Data

US 2004/0183723 A1 Sep. 23, 2004

Related U.S. Application Data

(60) Provisional application No. 60/433,038, filed on Dec. 11, 2002.

(51) Int. Cl.
*G01S 5/14* (2006.01)
(52) U.S. Cl. ................ 342/357.1; 342/357.15

(58) Field of Classification Search .......... 342/357.15, 342/357.1
See application file for complete search history.

(56) References Cited

U.S. PATENT DOCUMENTS

| | | | | |
|---|---|---|---|---|
| 5,103,459 | A | * | 4/1992 | Gilhousen et al. .......... 370/206 |
| 6,016,312 | A | * | 1/2000 | Storm et al. ................ 370/311 |
| 6,064,336 | A | | 5/2000 | Krasner ................. 342/357.05 |
| 6,150,980 | A | * | 11/2000 | Krasner ................... 342/357.1 |
| 6,369,751 | B1 | * | 4/2002 | Naruse .................... 342/357.1 |
| 6,421,002 | B2 | * | 7/2002 | Krasner ................... 342/357.1 |
| 2003/0214432 | A1 | * | 11/2003 | Tawadrous et al. ...... 342/357.1 |

FOREIGN PATENT DOCUMENTS

| | | |
|---|---|---|
| GB | 2307812 | 11/1996 |
| WO | 0173467 | 10/2001 |

* cited by examiner

*Primary Examiner*—Gregory C. Issing
(74) *Attorney, Agent, or Firm*—Philip Wadsworth; Bruce W. Greenhaus; Donald C. Kordich

(57) ABSTRACT

A wireless remote unit performs SPS acquisition interleaved with receiving paging information over a wireless slotted paging channel and receiving data packets over a wireless data communication system. The remote unit tunes to a pilot channel, synchronizes to an internal clock of the wireless remote unit with a pilot signal transmitted over the pilot channel; and starts a search for SPS satellites after completing synchronization with the internal clock.

19 Claims, 3 Drawing Sheets

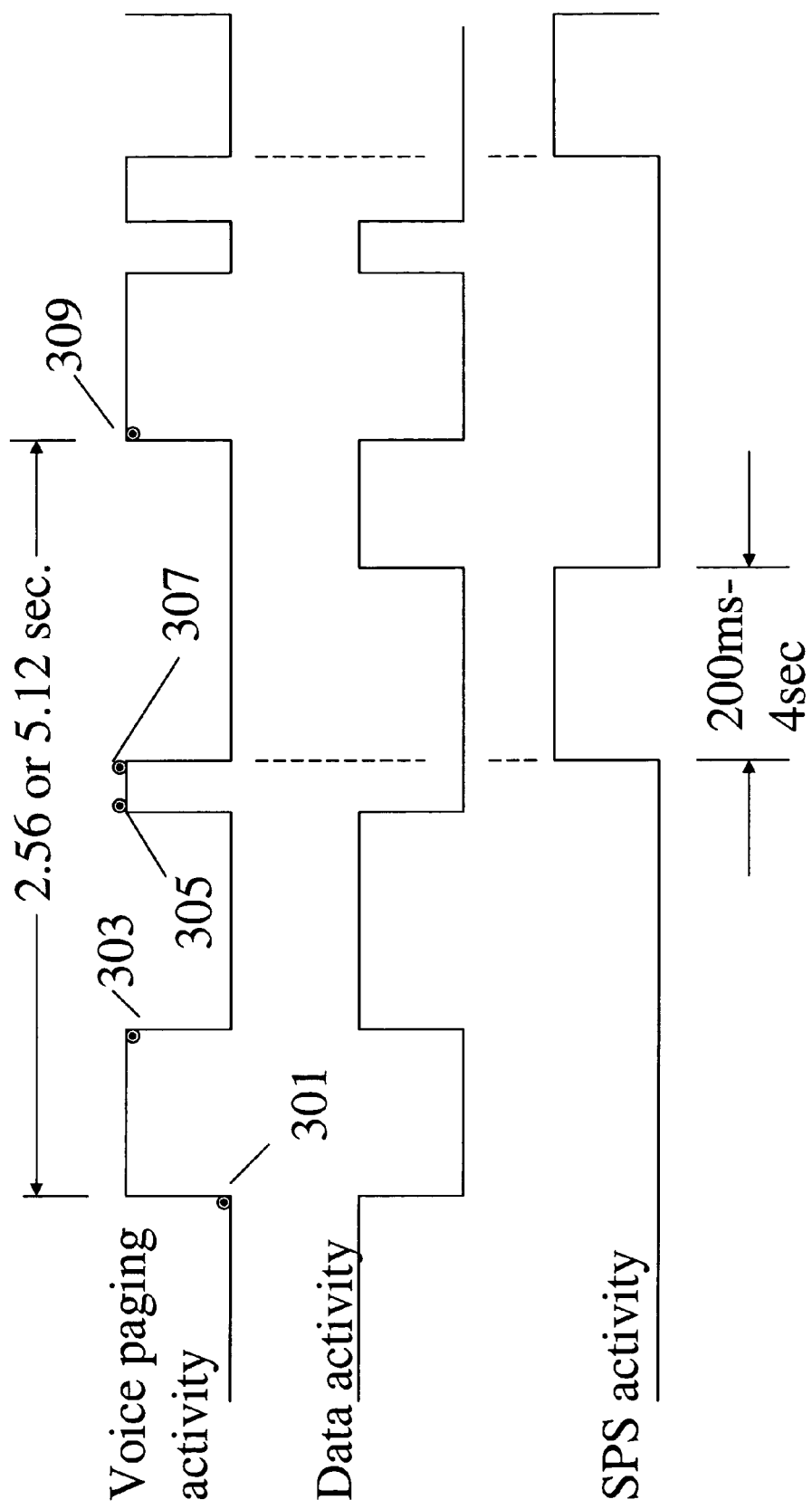

METHOD AND APPARATUS FOR SCHEDULING SEARCH FOR AND ACQUISITION OF GLOBAL POSITIONING SATELLITES

CROSS-REFERENCES TO RELATED APPLICATIONS

The present application claims the benefit of U.S. Provisional Application Patent No. 60/433,038 filed Dec. 11, 2002.

BACKGROUND

The present invention relates generally to the field of wireless communication, and, more particularly, to a apparatus for scheduling search for and acquisition of global positioning satellites, and methods therefore.

BRIEF SUMMARY

The present invention, which tends to address this need, resides in a wireless remote unit, and method therefore. The wireless remote unit and methods described herein provides advantages over known search and acquisition techniques in that it provides for a reduced search time to acquire Satellite Positioning System (SPS) satellites. By attempting to receive the SPS satellite signals immediately after a paging slot, during which the clock of the remote unit has been synchronized to the pilot channel, the "search time" required to "acquire" the SPS satellite signals is reduced.

BRIEF DESCRIPTION OF THE DRAWINGS

Other objects and advantages of the invention will become apparent upon reading the following detailed description with reference to the following accompanying drawings.

FIG. 3 is a timing diagram that illustrates the tuner within the remote unit tuned to receive the paging channel from the voice base station 105 when the remote unit becomes aware of the need to search for and acquire SPS satellite signals.

Figure 1:
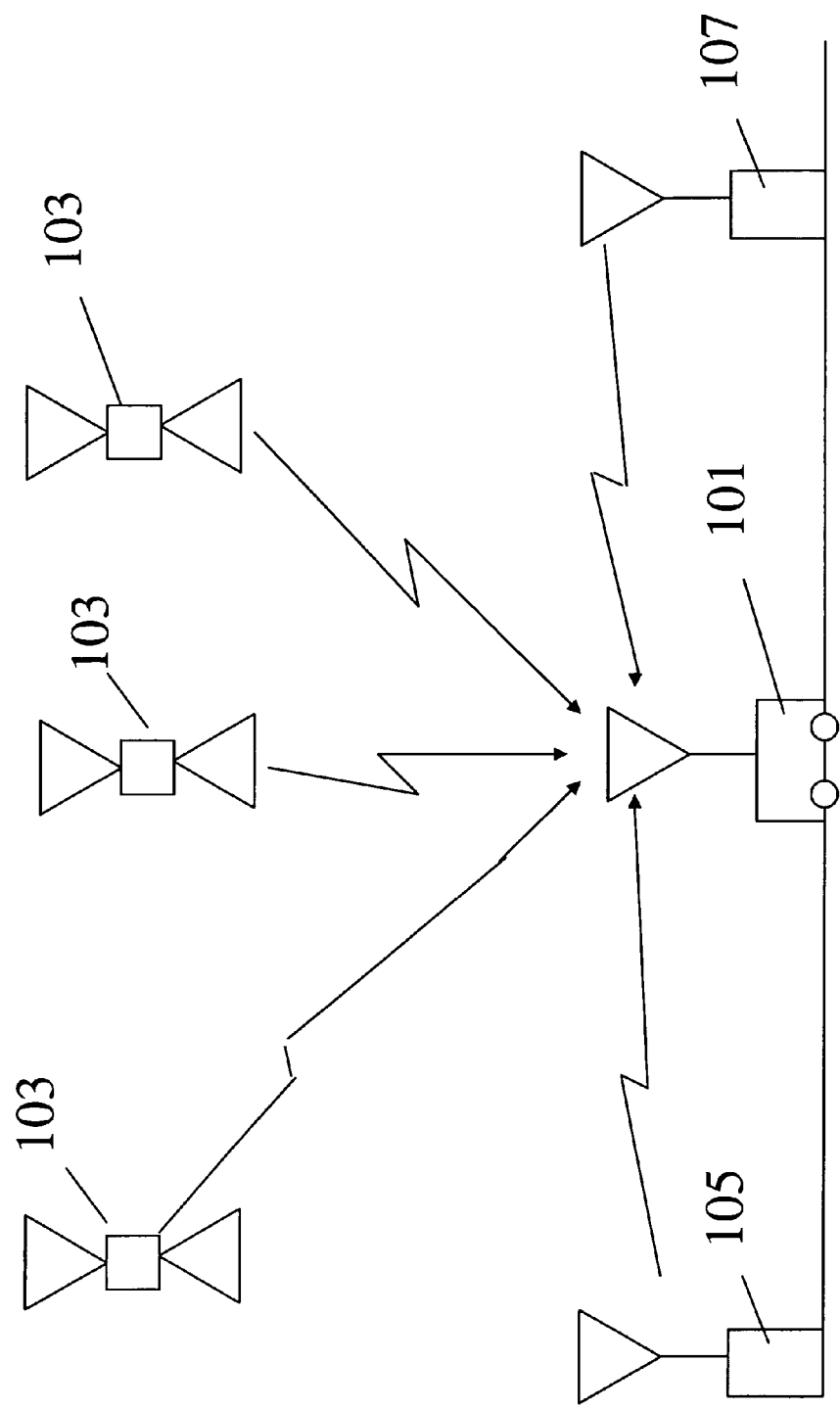
FIG. 1 illustrates a system in which a wireless remote unit 101 receives signals from three different sources.

While the disclosed subject matter is susceptible to various modifications and alternative forms, specific embodiments thereof have been shown by way of example in the drawings and will be described in detail. It should therefore be understood that the invention is defined only by the appended claims and not limited to the particular embodiments of the disclosed subject matter.

DETAILED DESCRIPTION

FIG. 1 illustrates a system in which a wireless remote unit 101 receives signals from three different sources. The remote unit can be of conventional design having logic and control circuitry and radio frequency circuitry for carrying out the functions of the remote unit. The first source is a constellation of Satellite Positioning System (SPS) satellites 103. The second source is a cellular base station (hereafter referred to as voice base station 105) transmitting voice information, such as a CDMA 2000 1X system in accordance with the Telecommunications Industry Association (TIA) standard IS-2000. The third source is a cellular base station (hereafter referred to as data base station 107). The data base station 107 transmits data packets, such as are transmitted in accordance with CDMA 2000 EV-DV as defined in TIA publication IS-2000. It should be noted that in some cases the same base station could be used to transmit both the voice and data signals.

Figure 2:
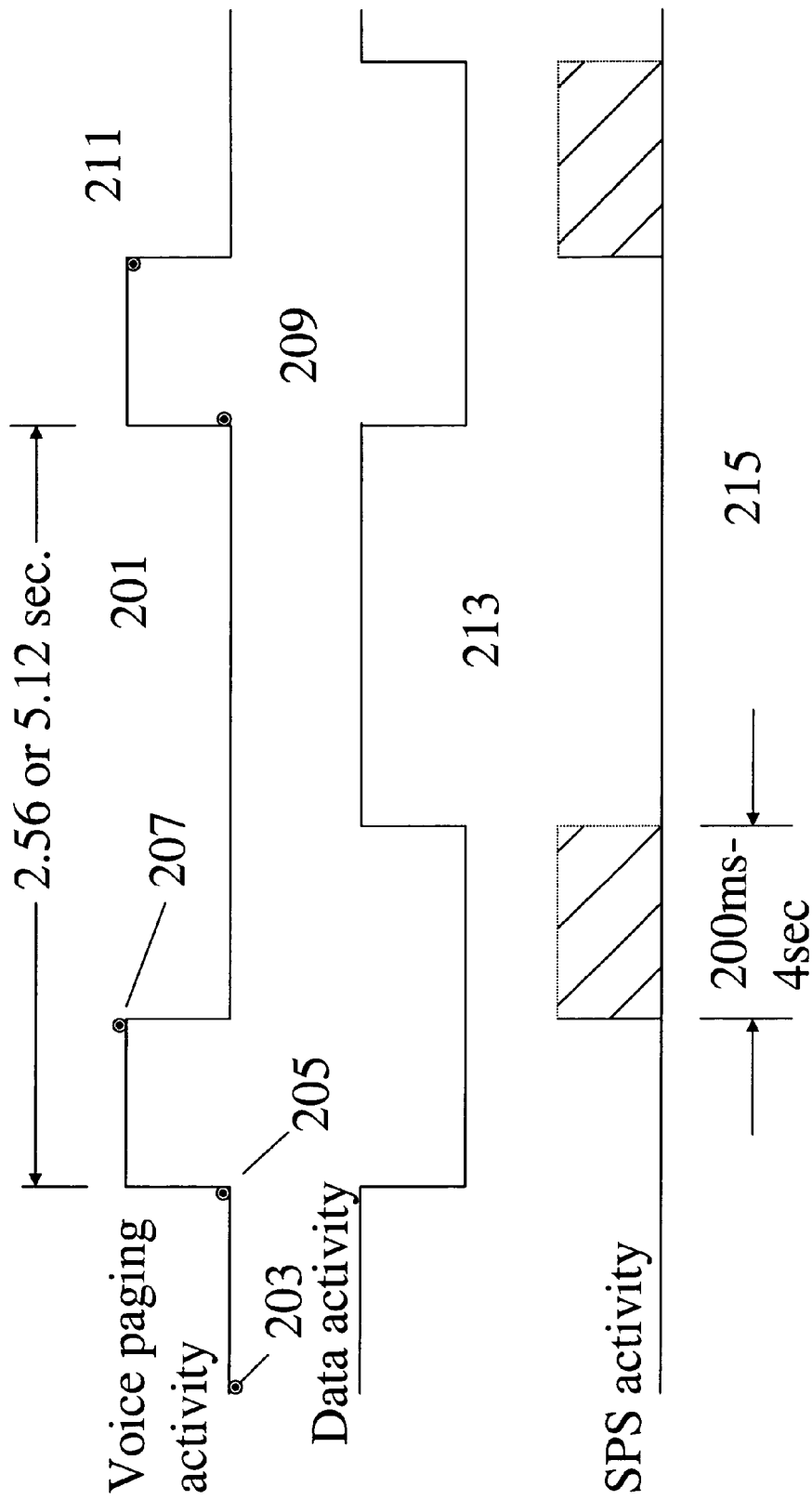
FIG. 2 is a timing diagram indicating the relative timing of the receiver in the remote unit.

FIG. 2 is a timing diagram indicating the relative timing of the receiver in the remote unit. The receiver is capable of being tuned to any one of the three communication sources 103, 105, 107. The voice paging activity line 201 indicates when the receiver within the remote unit is tuned to receive paging signals from the voice base station 105. Likewise, the data activity line 213 indicates whether the tuner is tuned to receive signals from the data base station and the SPS activity line 215 indicates whether the tuner in the remote unit 101 is tuned to receive signals from the constellation of SPS satellites.

At a first point in time 203, the tuner is tuned to receive signals from the data base station 107. Since the tuner is capable of being tuned to only one of the three possible signal sources, it should be clear that the tuner will not be tuned to receive either satellite signals from the satellites within the SPS satellite constellation or from the voice base station 105. This is indicated by the fact that the voice paging activity line 201 and the SPS activity line are both in the low state. This condition represents the times at which the remote unit 101 is receiving data signals on a data traffic channel from the data base station 107.

At a second point in time 205, a scheduled paging slot will occur during which time signals are transmitted from the voice base station 105 to the remote unit 101. These signals indicate whether another device (a conventional telephone or other such device) is attempting to establish a call to the remote unit 101. In order to ensure that attempts to establish a call to the remote unit 101 are successful, it is desirable to check these incoming voice paging signals at each scheduled paging slot. Accordingly, the tuner within the remote unit 101 is tuned to the voice paging channel transmitted from the voice base station 105. As mentioned above, this means that the tuner within the remote unit 101 will no longer be tuned to the data base station 107, as indicated by the fact that data activity line 213 transitions to the low state at the point 205 at which the voice paging activity line 201 transitions to the high state. It should be noted that the SPS activity line 215 remains in the low state.

During the time that receiver is receiving paging signals from the voice base station 105, the remote unit 101 also receives signals over a pilot channel transmitted by the voice base station 201. The remote unit 101 synchronizes an internal clock to a pilot signal. The pilot channel is transmitted on the same frequency as the paging channel transmitted from the voice base station 105. It should be noted at this time that the information transmitted by the voice base station 105 if operating in accordance with a code division multiple access (CDMA) transmission scheme is divided into separate transmission channels by the encoding each channel with a distinct code. For example, a paging channel is encoded using one particular code. A traffic channel is encoded using another code. A pilot channel is encoded using yet another code. Accordingly, each of these channels can be used to transmit different information simultaneously on the same frequency. This allows the tuner of the remote unit 101 to be tuned to the pilot channel transmitted from the voice base station 105 while also receiving signals transmitted on a paging channel transmitted from the voice base station 105 on the same frequency.

The frequency of the signals transmitted over the pilot channel are very precisely controlled. Accordingly, by synchronizing the clock in the remote unit 101 with the pilot channel (i.e., to the frequency of the pilot signal transmitted on the pilot channel), the frequency of the clock is very precisely controlled. In addition, very precise information indicating the time of day is also transmitted by the voice base station 105 and received by the remote unit 101 during the paging slot. Accordingly, the local clock maintained within the remote unit 101 is updated with both accurate frequency and time of day information.

Ideally, the time of day will be exactly the same as the time of day indicated by the clocks within each of the satellites of the SPS constellation. However, it should be noted at this time that there are two factors that make the time of day less than ideal. The first is the amount of time required for the signal to propagate from the voice base station 105 to the remote unit 101 (i.e., propagation delay). Even thought the signals travel at the speed of light, the distances are sufficiently great to create a significant delay in the time between transmission and reception. The second factor is the inaccuracy of the clock in the voice base station. The time of day transmitted from the voice base station 105 is only as accurate as the local clock that keeps time within the voice base station 105. While the local clock in the voice base station 105 is synchronized to the clocks in the SPS satellites 103, that clock will drift over the time between synchronization times.

Despite the inaccuracy of the time of day received by the remote unit 101, the local clock within the remote unit 101 is most accurate immediately following the synchronization that occurs during the paging slot. Accordingly, in accordance with one embodiment of the presently disclosed method and apparatus, reception of data over the data channel from data base station 107 is delayed for a bit longer while the tuner within the remote unit 101 is tuned to the SPS satellites 103. This is shown in FIG. 2 by the voice paging activity line 201 going to the low state at time 207 (indicating the end of the paging slot). At that time 207, the tuner within the remote unit 101 is tuned to the frequency of the SPS satellites 103, as shown by the SPS activity line 215 going to the high state at time 207. It should be understood that the SPS satellites described herein operate in a CDMA mode such that all of the satellites 103 within the SPS constellation transmit their information on the same frequency. Each satellite is assigned a unique code that allows the receiver within the remote unit 101 to distinguish between signals transmitted by each particular satellite 103.

By having the tuner in the remote unit 101 tune to the SPS satellites 103 immediately after the paging slot, the search for the satellites is made shorter. That is, in order to receive signals from the SPS satellites 103, the remote unit 101 must determine what exact frequency to tune to and what time it is relative to the clock that is running in the SPS satellites 103. It should be noted that while the frequency transmitted by the SPS satellites 103 is relatively accurate, the relative motion of the satellites with respect to the remote unit 101 causes a Doppler shift in the frequency that is received at the remote unit 101. Nonetheless, the remote unit 101 preferably has information from which it can determine the frequency at which it should expect to receive the SPS satellite signals. However, if the clock in the remote unit 101 is not accurate, then the clock must be adjusted each time the attempt to receive the SPS satellite signals fails. The more inaccurate the clock within the remote unit 101, the more times the attempts to receive the SPS satellite signals will fail. Therefore, by attempting to receive the SPS satellite signals immediately after the clock has been synchronized to the paging channel of the voice base station 105, the "search time" required to "acquire" the SPS satellite signals is reduced. In addition, if the SPS search results are to be used together with search results from an earlier search (i.e., pseudo-range measurements made during a prior SPS satellite search period), then the bias of the local clock (i.e., the error in the local with respect to the time maintained by the SPS satellites) will be relatively constant, since the clock will be synchronized to the clock in the base station with a relatively constant bias. Those skilled in the art will appreciate the benefit of having pseudo-range measurements that have a constant bias.

There may be a relatively long period of time between the time a request to perform an SPS search is received by the remote unit 101 and the end of a paging slot. Therefore, in another embodiment of the disclosed method and apparatus, the tuner within the remote unit 101 is tuned to receive the paging channel from the voice base station 105 when the remote unit 101 becomes aware of the need to search for and acquire SPS satellite signals. A timing diagram that illustrates this embodiment is shown in FIG. 3. However, since the tuner in the remote unit 101 is not being tuned to the voice paging channel during a paging slot associated with the remote unit 101, the remote unit need not demodulate the data on the paging channel. Rather, the only function that is performed is to synchronize the local clock and determine the correct time of day. These functions are performed relatively rapidly. The example of FIG. 3 illustrates the remote unit 101 being tuned to the voice paging channel at a first point in time 301 which is coincident with the beginning of a paging slot. Accordingly, the tuner of the remote unit 101 is not tuned to either the data base station 107 or the SPS satellites 103.

At a second point in time 303, which occurs immediately at the end of the paging slot, the tuner within the remote unit 101 is tuned back to the frequency on which signal from the data base station 107 are transmitted. At a third point in time 305 (which may be some relatively insubstantial amount of time after the remote unit receives a request to do an SPS search and acquisition), the tuner of the remote unit 101 is tuned to once again receive signals over the voice paging channel transmitted by the voice base station 105. At a fourth point in time 307, once the local clock of the remote unit 101 has been resynchronized to the time reference of the voice base station 105, the tuner of the remote unit 101 is tuned to search for and acquire the signals transmitted by the SPS satellites 103. This process takes between 200 milliseconds and 4 seconds, depending upon the signal quality (i.e., signal strength, et al.) of the satellite signals. Preferably, the search will only be done prior to the next paging slot (which in FIG. 3 occurs at a fifth point in time 309) if the remote unit determines that the search is likely to be completed prior to the beginning 309 of that next paging slot. It will be understood that this is preferable since it is desirable to tune the remote unit 101 to the voice paging channel at the beginning of the next paging slot to ensure that no pages are missed. However, it is also desirable to ensure that the SPS search and acquisition is completed before leaving the SPS satellite frequencies, especially once they have been located in frequency and time.

The remote unit 101 estimates the amount of time required to perform the SPS search and acquisition based upon the amount of time required for recent attempts to acquire the SPS satellites 103. In one embodiment of the present disclosed method and apparatus, only the amount of time required for the last attempt is used. In other embodiments, the amount of time is a combination of times required for two or more of the most recent attempts. These times might be weighted to place more significance on the most recent attempts, for example. Alternatively, the times of the most recent attempts may be combined in a straight average (times for each recent attempt are added and divided by the number of times added). The number of attempts may be selected based upon how long ago the attempt was made or based on a desire to have a specified number of attempt or some combination of these criteria, such as the most recent 5 attempts, assuming that all 5 were made within the last one minute.

It will be understood by those skilled in the art that upon performing a successful search and acquisition and additionally determining the location of the remote unit 101, the remote unit will have a very accurate time of day value to which the remote unit's local clock is synchronized. This is due to the fact that the remote unit 101 solves the conventional four equations in four unknowns associated with SPS satellite position location. That is, using the pseudo-range from the remote unit 101 to a first satellite 103, the pseudo-range to a second satellite 103, the pseudo-range to a third satellite, and the pseudo-range to a fourth satellite 103, and knowing the locations of these four satellites 103, the remote unit can solve for the position of the remote unit 101 in the x, y, and z spatial dimensions and for the clock bias of the local remote unit clock (assuming that the local remote unit clock does not have too great a bias with respect to the satellites 103). Accordingly, directly after a position location search has been performed, the time of day in the remote unit 101 is nearly equal to the time of day in the satellites 103 (i.e., the bias of the local clock in the remote unit 101 is nearly zero). If the remote unit 101 attempts to acquire satellites 103 within a relatively short period of time, the local clock will have a bias that is relatively small, depending upon the amount of drift in the local clock. However, the local clock will tend to drift out of synchronization more and more as time passes without another SPS position location calculation being performed using freshly acquired pseudo-range measurements.

In accordance with one embodiment of the presently disclosed method and apparatus, the remote unit 101 has several power saving modes. In one such power saving mode, all functions in the remote unit 101 are halted to reduce the power consumption of the remote unit 101 to a minimum. On regular intervals, the remote unit 101 wakes up to check whether anything has changed (i.e., whether there were any requests made for action to be taken by the remote unit 101). One example of a request for action to be taken is for the use of the remote unit 101 to have pressed keys on a keyboard or keypad of the remote unit 101. If someone has requested the remote unit's attention, then the remote unit 101 will wake up and respond to the request. If the no request is made for the remote unit's attention, then the remote unit 101 goes back to sleep. However, the remote unit 101 wakes up at paging slots to receive the information sent over the voice paging channel by the voice base station 105. If no one is attempting to establish a call to the remote unit 101, then the remote unit 101 returns to sleep.

In accordance with a second power saving mode, the remote unit 101 reduces the amount of power being consumed by halting all operations, but keeps the local clock running. By keeping the local clock running, the local clock remains more closely synchronized to the time in the voice base station 105 to which it was last synchronized. This mode is called "fake sleep". Fake sleep allows the remote unit to save power without losing the benefit of the clock synchronization that would occur if the clock were turned off. That is, the clock can be resynchronized at the next paging slot, or as shown in FIG. 3 by tuning to the voice paging channel of the voice base station 105 for a short period of time. However, such synchronization is not as accurate as the clock might be if the clock were synchronized to by a recently performed SPS position location calculation and the clock were to remain running. Accordingly, in one embodiment of the presently disclosed method and apparatus, the tuner in the remote unit 101 need not be tuned to the voice paging channel transmitted by the voice base station 105 if a position location calculation has been performed sufficiently recently. The definition of how recent this would be depends the stability of the local clock within the remote unit 101. Nonetheless, it will be understood that for each remote unit and associated local clock, there will be some range within which the clock will remain more accurate then can be achieved by synchronizing to the signals received from the voice base station 105.

In view of the above, a method and apparatus has been described for searching and acquiring SPS satellites using a remote unit that has the ability to receive and send both voice and data in addition to being able to receive SPS satellite signals. As noted above, while the disclosed subject matter is susceptible to various modifications and alternative forms, specific embodiments thereof have been shown by way of example in the drawings and will be described in detail. It should therefore be understood that the invention is defined only by the appended claims and not limited to the particular embodiments of the disclosed subject matter.

What is claimed is:

1. A method for operating a wireless remote unit, including a receiver and an internal clock, comprising the steps of:
   tuning, at a first time, the receiver to a pilot signal, having a pilot frequency, transmitted from a first communication base station;
   receiving, by the receiver, the pilot signal from the first communication base station, responsive to the step of tuning the receiver to the pilot signal;
   synchronizing the internal clock with the pilot signal, responsive to the step of receiving the pilot signal;
   tuning, at a second time, different from the first time, the receiver to at least one satellite signal having a satellite frequency, different from the pilot frequency, transmitted from at least one satellite in a satellite positioning system (SPS), responsive to the step of synchronizing; and
   receiving, by the receiver, the at least one satellite signal from the at least one satellite, responsive to the step of tuning the receiver to the at least one satellite signal.

2. The method, according to claim 1, wherein the step of synchronizing further comprises the step of:
   updating at least one of the following for the internal clock: a clock frequency and a time of day.

3. The method, according to claim 1, further comprising the steps of:
   estimating that synchronizing the internal cloak with the pilot signal is less accurate than synchronizing the internal clock with the at least one satellite signal, responsive to the step of receiving the ax least one satellite signal; and
   synchronizing the internal clock with the at least one satellite signal, responsive to the step of estimating.

4. The method according to claim 1, further comprising the steps of:
   receiving a request to receive the at least one satellite signal, determining that the wireless remote unit is not presently tuned to another signal responsive to the step of receiving the request;

estimating that a first expiration of a first time period needed to perform the steps of: tuning to the pilot signal, receiving the pilot signal, synchronizing, tuning to the at least one satellite signal, and receiving the at least one satellite signal, is less than a second expiration of a second time period at which the wireless remote unit is scheduled to perform the step for tuning to the pilot signal, responsive to receiving the request; and performing the steps of: tuning to the pilot signal, receiving the pilot signal, synchronizing, tuning to the at least one satellite signal, and receiving the at least one satellite signal, responsive to the steps of determining and estimating.

5. The method according to claim 4, wherein the step of estimating further comprises the step of:

using at least one recent estimate of the first expiration of the first time period.

6. The method according to claim 4, further comprising the step of:

preventing demodulation of data during the step of receiving the pilot signal.

7. The method according to claim 1, further comprising the steps of:

tuning, at third time, different from the first time or the second time, the receiver to a data signal, having a data frequency, different from the pilot frequency and the satellite frequency, transmitted from a second communication base station; and receiving, by the receiver, the data signal from the second communication base station, responsive to the step of tuning to the data signal.

8. The method according to claim 7, wherein the first communication base station and the second communication base station are the same or different communication base stations.

9. The method according to claim 7, wherein the second time is between the first time and the third time.

10. The method according to claim 1, farther comprising the step of:

expecting to receive the pilot signal at a scheduled time, wherein the step of tuning to the pilot signal is performed responsive to the step of expecting.

11. The method according to claim 1, wherein the at least one satellite signal is encoded using a code division multiple access (CDMA) encoding scheme.

12. The method according to claim 1, wherein the pilot signal is encoded using a code division multiple access (CDMA) encoding scheme.

13. The method according to claim 1, wherein the pilot signal is received during slotted paging communications.

14. The method according to claim 1, further comprising the step of:

processing location information, representative of a location of the wireless remote unit, responsive to the steps of synchronizing and receiving the at least one satellite signal.

15. The method according to claim 1, wherein the step of tuning the receiver to the at least one satellite signal is performed immediately after the step of synchronizing is completed.

16. A wireless remote unit comprising:

a tuner for:
tuning, at a first time, a receiver to a pilot signal, having a pilot frequency, transmitted from a first communication base station, and
tuning, at a second time, different from the first time, the receiver to at least one satellite signal having a satellite frequency, different from the pilot frequency, transmitted from at least one satellite in a satellite positioning system (SPS);

a receiver for:
receiving the pilot signal from the first communication base station, responsive to the tuner tuning the receiver to the pilot signal, and
receiving the at least one satellite signal from the at least one satellite, responsive to the tuner tuning the receiver to the at least one satellite signal;

an internal clock for providing timing information;

a processor for synchronizing the internal clock with the pilot signal, responsive to the receiver receiving the pilot signal.

17. The wireless remote unit, according to claim 16, wherein the timing information further comprises:

at least one of the following: a clock frequency and a time of day.

18. The wireless remote unit, according to claim 16, wherein the at least one satellite signal is encoded using a code division multiple access (CDMA) encoding scheme.

19. The wireless remote unit, according to claim 16, wherein the pilot signal is encoded using a code division multiple access (CDMA) encoding scheme.

* * * * *